Feb. 2, 1965  I. J. VOULLAIRE  3,168,204
APPARATUS FOR PACKING FRUIT
Filed June 25, 1962  2 Sheets-Sheet 1

Inventor
Izak J. Voullaire
By Sommers & Young
Attorneys

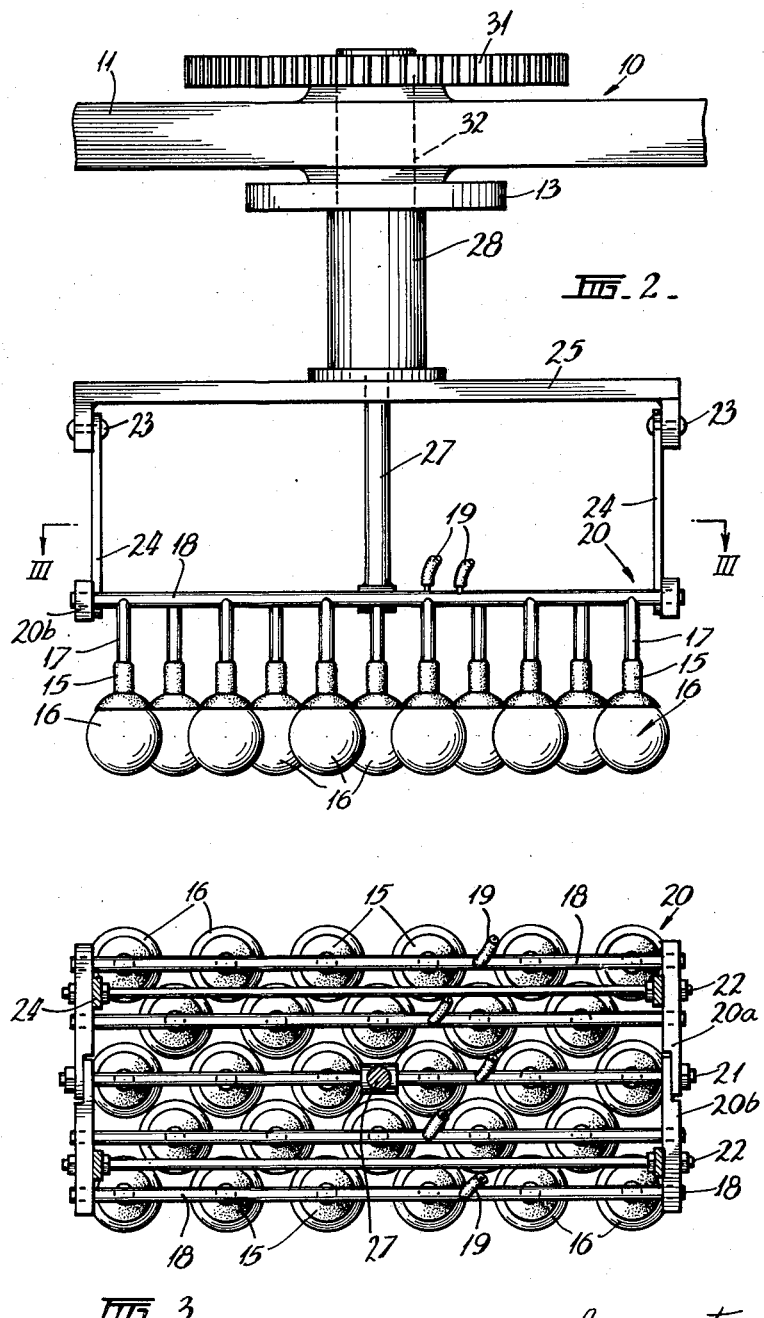

United States Patent Office 3,168,204
Patented Feb. 2, 1965

3,168,204
APPARATUS FOR PACKING FRUIT
Izak Johannes Voullaire, Mildura, Victoria, Australia
Filed June 25, 1962, Ser. No. 204,738
Claims priority, application Australia June 29, 1961
7 Claims. (Cl. 214—6)

This invention relates to the art of packing fruit in cases and more particularly is directed to an improvement in or modification of the invention forming the subject matter of Patent No. 2,938,315, insofar as the pick-up head is concerned.

It is customary in the present practice governing the packing of citrus fruits in many countries that each layer of fruit shall be made up of a number of transverse rows each containing a given number of pieces of fruit, and having alternate transverse rows in substantial longitudinal alignment while successive rows are staggered relative to one another by an amount approximately equal to half the diameter of the fruit. The practice also requires that the transverse rows of fruit in one layer are staggered by a similar amount in relation to the row immediately below it. Thus, alternate layers are not quite identical but are complementary to one another.

By arranging the rows and layers of fruit in this manner the most economic use of the cubic capacity of the fruit case is obtained. This arrangement also gives a degree of interlocking between the layers of fruit and thus reduces the possibility of damage to the fruit by movement within the case during transit.

It will be understood that the cases used for this purpose are standardized, having predetermined basic dimensions which constitute the dimensions of each layer of fruit, and being of predetermined height.

It is the present practice to manually pack the fruit in layers in the cases with the rows of fruit in the required formation and notwithstanding the use of skilled labour the operation is time consuming and costly under prevailing labour costs.

It is the principal objective of the parent invention to provide an efficient method of mechanically packing fruit in cases without the use of manual labour, the method of handling the fruit being such as to prevent or at least reduce to a minimum the possibility of damage to the fruit.

Patent No. 2,938,315 describes the method of mechanically packing fruit in cases comprising the steps of forming a layer of fruit with the fruit arranged in predetermined row formation to fit a selected fruit case, engaging the layer so as to maintain it intact, transferring the layer to a release position disposed relative to the fruit case, and releasing the layer whereby the fruit will assume the said row formation in said case.

It is a feature of this method that the layer of fruit preparatory to being moved towards the case, is engaged in such manner as to be maintained intact and in the required formation during transfer to the case.

In carrying out the method above defined, the initial step comprises feeding the fruit in a number of rows corresponding to the packing position whereby a layer of fruit is assembled in the precise row formation that the layer will take when deposited in the case.

In one application the layer of fruit thus formed, which is substantially rectangular and of the said predetermined size, is subjected to inwardly directed peripheral pressure to maintain the fruit in the required formation. To prevent disintegration of the layer, however, whilst being bodily moved to the release position relative to the fruit case, the layer is preferably converted to and maintained in a convex or domed shape against a suitable former. The open, unsupported side of the layer, opposite to the former, is thus concave and, on the principle of the arch, the layer is prevented from collapsing even when downwardly directed.

To contribute to the maintenance of the mass assembly of the layer of fruit with each article touching, resilient means may also be applied to the articles of fruit to thus provide a compact mass of the abovementioned form.

The fruit case is disposed to coincide with the layer of fruit reaching the release position, whereafter the layer of fruit, upon the said pressure being released, falls in its row formation to assume that position in the case. The layer spreads from the convex form after being released in the case to neatly fill the basic area of the latter.

The height of the fruit case relative to the transported layer, or vice versa, is determined whereby the fruit when released contacts the bottom of the case, or the previous layer therein, according to the degree of progress in packing the fruit in the case, which is accomplished layer by layer.

In the method of the parent invention, preferably as one layer of fruit is being formed the preceding layer is being released in the fruit case so as to maintain continuity of operation and rapid filling of the case.

To implement the above stated method there is provided, according to the parent invention, apparatus for mechanically packing fruit in cases comprising means for delivering articles of fruit to form a layer thereof with the fruit in predetermined row formation to fit a selected fruit case, means co-operating with said first mentioned means to, firstly, engage the layer so as to maintain it intact, secondly, transfer the layer to a release position disposed relative to the fruit case, and thirdly, release the fruit whereby the latter will assume within the fruit case the said row formation.

The present invention is directed to improved means for engaging the layer of fruit when formed in the prescribed formation so as to maintain it intact during transfer of the layer to the release position.

In patent specification No. 2,938,315, there is described apparatus including a form of mechanical pick-up head which picks up a layer when formed by simultaneously raising the centre of the layer so that it takes up a convex configuration (viewed from above) and exerting pressure by means of flaps actuating inwardly upon the perimetric rows of fruit. The layer is thus gripped and held against a superimposed former whereby the said convex configuration is maintained so that the layer can be transported with the pick-up head and eventually lowered into a waiting fruit case where it is released and the layer of fruit deposited in the correct predetermined row formation.

The mechanisms employed in performing the above referred to operations are somewhat complex and it is the primary object of the present invention to simplify this mechanism, and consequently reduce the ultimate cost of the fruit packing machine.

With this object in view, there is provided, according to the present invention, apparatus for mechanically packing fruit in cases as described in the specification of Patent No. 2,938,315, wherein the means to engage the pre-formed layer of fruit so as to maintain it intact whilst being transferred to and released within the fruit case, comprises a plurality of suction cups operatively connected to a source of vacuum or sub-atmospheric pressure so arranged and controlled that each article of fruit is simultaneously vacuum attached to an individual suction cup and retained thereby in substantially the predetermined row formation of the said layer until required to be released.

To enable the layers of fruit to be inserted with facility into the fruit case it is necessary to reduce the outside overall dimensions of the layer and this may be accomplished as previously described by arching the centre of the layer into convex configuration and simultaneously drawing in the outer rows of fruit.

To achieve this in the present invention the suction cups are preferably disposed at the ends of short pipes, all of which, with the exception of those relating to the outer rows, are arranged to be raised slightly after the fruit has been vacuum attached thereto. The pipes associated with the outer rows may be pivotally or flexibly mounted and either positively on spring biased inwardly so that the fruit in those rows takes up a position slightly beneath the other rows and inwardly of their original predetermined row formation.

After transporting the layer thus supported to within the fruit case, the articles of fruit are released by a momentary breaking of the vacuum in the said pipes and suction cups.

Obviously other arrangements may be employed to bring about the above operations in the vacuum system, which may be of any suitable known type.

One practical arrangement of the invention will now be described with reference to the accompanying drawings in which:

FIG. 2 is a side elevation of one of the pick-up heads, and

FIG. 3 is a plan view taken on the line III—III of FIG. 2.

Figure 1:
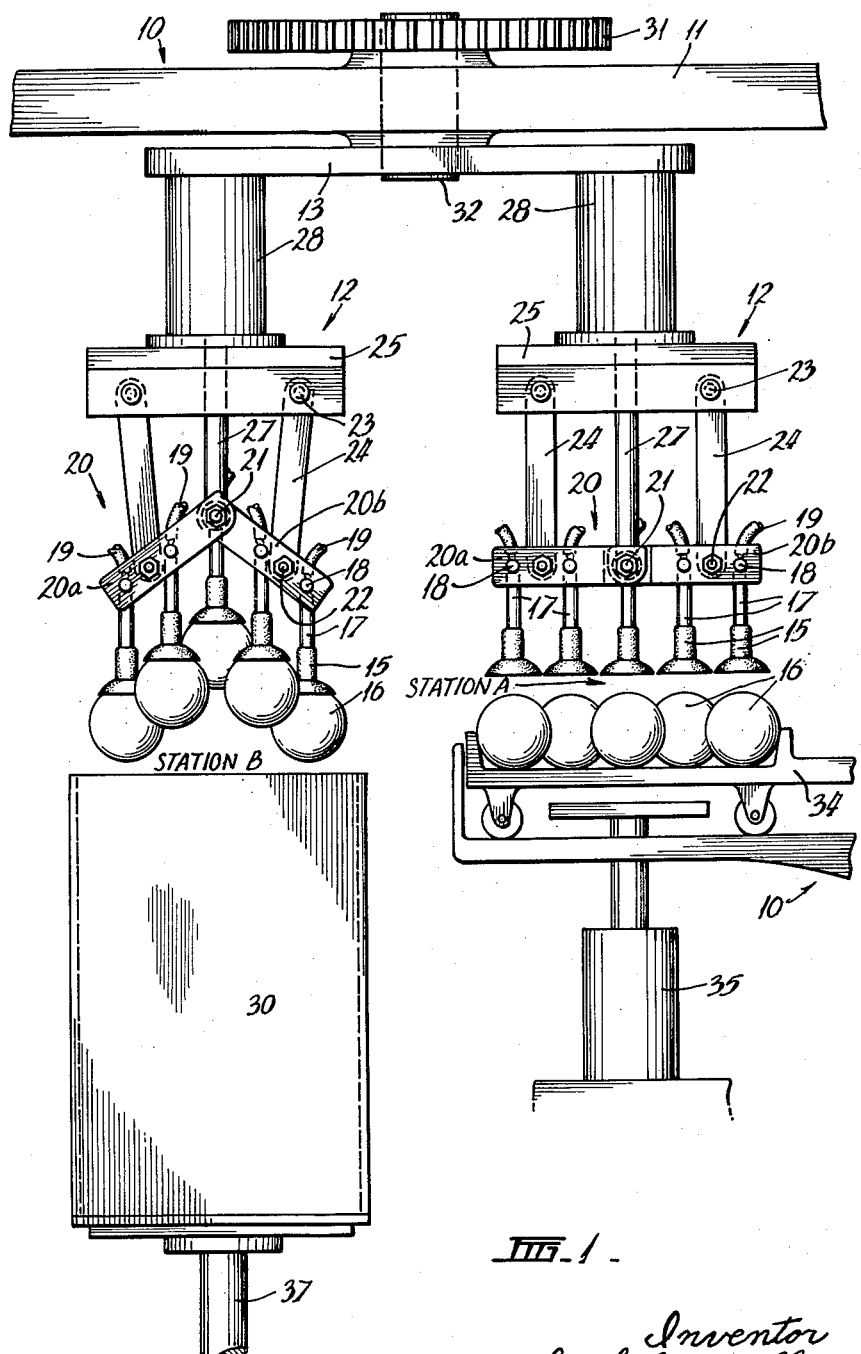
FIG. 1 is an elevation of a pair of pick-up heads, according to the invention, and shows schematically the relation of the pick-up heads to a pre-formed layer of fruit and a fruit case in which the layer is to be deposited.

Referring to the drawings the main frame 10 of the fruit packing machine has a transverse beam 11 which rotatably supports a pair of similar pick-up heads 12, mounted one at each end of a horizontal member 13. The pick-up heads being substantially identical, a description of one will apply to the other.

A pick-up head comprises a plurality of suction cups 15, the number and disposition of which corresponds to the particular layer formation 16 to be picked up.

The suction cups 15, which are made of rubber or like resilient material, are each attached to the lower end of a rigid pipe 17 forming a downwardly directed branch of one of a series of horizontal air-tight pipe-lines 18, connected to a source of vacuum by flexible tubes 19.

The pipe-lines 18 are rotatably supported in a frame 20, centrally hinged at 21 to constitute two sub-frames 20a and 20b, each of which sub-frames is pivotally mounted for rocking about a horizontal axis 22 parallel to the axis of the said central hinge 21.

The rocking axis 22 of the sub-frames is supported in depending links 24, pivotally mounted at 23 upon the back-plate 25 of the pick-up head 12.

The central hinge 21 is connected by piston rod 27 to a power actuated cylinder 28, which may be either hydraulically or pneumatically operated, whereby the sub-frames 20a, 20b, can be disposed at an obtuse angle to one another and so produce an arching of the frame 20 responsive to the said power actuation, as shown at station B, FIG. 1. It will be seen that this arching of the frame 20 appreciably reduces the overall width of the original layer of fruit 16, so that it can be readily inserted into a fruit case 30.

The pick-up head assembly comprising the pair of pick-up heads 12 and power actuated cylinders 28 mounted on the member 13, is rotated (or oscillated) through 180° at predetermined intervals so as to alternately position each pick-up head at station A and station B, and vice versa. This may be achieved by any suitable known mechanism, operating for example a gear wheel 31, driving the spindle 32, which rotatably supports the said assembly in the frame 10.

In operation, a layer of fruit arranged in predetermined row formation as hereinbefore described, is presented to station A of the machine by conveyor means indicated at 34 in FIG. 1, at which station the pick-up head 12 maintains the array of suction cups 15 in one horizontal plane. As previously mentioned, the number and disposition of the cups 15 corresponds to the layer formation 16.

The conveyor means 34 is then raised, for example by pneumatic or hydraulic power actuated means 35, to bring the articles of fruit in the layer 16 each into pressure contact with a cup 15, when a reduced pressure (referred to hereinafter as "vacuum") is applied to the cups through the flexible tubes 19 and pipes 17, whereby the layer of fruit is retained in the pick-up head. The conveyor means 34 is then lowered to resume its normal station A position from which it is subsequently moved to receive another layer of fruit in predetermined row formation, and returned to station A.

Whilst the latter operation is taking place the pick-up head assembly is rotated through 180°, so that the loaded pick-up head 12 arrives at station B, by when the actuating cylinder 28 and piston rod 27 have arched the frame 20, and consequently the layer of fruit, in readiness for insertion into the fruit case 30, which is registered with the pick-up head at that station. The fruit case 30 is then raised until the layer of fruit is at the required level within the case when the layer is released by breaking the vacuum in the suction cups 15, and the case 30 lowered to its normal station B position.

Raising and lowering of the fruit case 30 can be effected by any suitable known means such as a pneumatic or hydraulic power actuated means, indicated at 37.

The returning of the arched frame 20 to its horizontal plane may take place either partly or wholly before releasing the layer of fruit in the fruit case, or it may be delayed until a later stage, it being understood that once a layer is released the articles of fruit will automatically take up their position in required row formation in a substantially horizontal plane within the boundaries imposed by the sides of the case. Some individual adjustment will always be necessary since the articles of fruit are not entirely uniform in their spherical proportions; this adjustment is automatic and the disparities between the size and shape of individual articles of fruit is found to cancel out for practical purposes when a few layers have been packed.

Whilst a loaded pick-up head is unloading at station B, an empty pick-up head is going through the operations of picking up another pre-formed layer of fruit at station A, as above described, after which the assembly is rotated through 180° and the cycle repeated.

To enable the frame 20 with a layer of fruit intact to be readily inserted into a fruit case with respect to its longitudinal dimension, not only is the frame 20 made appreciably shorter than the inside length of the case but the pre-formed layer of fruit is also proportioned so that its overall length provides ample clearance in that direction. To compensate for this, the width of the layer at the station A pick-up stage is appreciably greater than the inside width of the case.

The arching of the layer reduces its width to well within that of the fruit case so that during insertion the necessary clearance in all directions is provided. As explained above, the layer of fruit, upon release, finally takes up its correct position in the fruit case automatically.

It will be appreciated by those conversant with the art, that the number of articles of fruit in a row and/or the number of rows in a layer will vary according to the size of the fruit being packed, it being understood that the fruit is previously graded.

In the instant specification, the example considered is a layer composed of 5 longitudinal rows, alternating 6–5–6–5–6 pieces of fruit per row, the rows of alternate complementary layers alternating 5–6–5–6–5 pieces. To accommodate this requirement, one pick-up head of the pair is adapted to one specific layer arrangement and the other pick-up head is adapted to the alternate complementary layer arrangement, and since the pick-up heads alternate between stations A and B, the correct alternating complementary layer formations are deposited in the fruit case.

For larger pieces of fruit, there may be 4 rows alternating 5 and 6 pieces, as described and illustrated in United States Patent No. 2,938,315. Other combinations of numbers of rows and pieces may, of course, be employed according to requirements.

To meet such variations in layer combinations, interchangeable pick-up heads 12 are provided, the number and disposition of the pipe-lines 18 and pipes 17 being arranged accordingly to position the suction cups 15 in register with the pieces of fruit in the particular layer. In other respects the pick-up heads would be the same as above described.

Obviously the actuating mechanisms could be varied from the pneumatic or hydraulic systems indicated, e.g. they could be electrical solenoid operated. Again, relative movement of the pick-up head and the conveyor means and/or the fruit case could be achieved by reciprocating the pick-up head. Likewise the arrangement for arching the layer of fruit could be varied without departing from the broad concept of the invention as defined in the claims which follow.

I claim:

1. Apparatus for mechanically packing fruit in cases comprising means for delivering articles of fruit to form a layer thereof at a pick-up position with the articles in predetermined row formation, means co-operating in timed relation with said first-mentioned means firstly to engage with and deform the layer at the pick-up position to dispose the articles of fruit in a convex form, secondly to lift and move the convex layer of fruit to a release position disposed relative to a fruit case of predetermined dimensions, and thirdly to release the layer of fruit to assume within the first case the said row formation, a source of partial vacuum, said lifting and moving means comprising a plurality of suction cups operatively connected to said source of partial vacuum, said cups being so arranged and controlled that each article of fruit is simultaneously vacuum attached to an individual suction cup and retained thereby in substantially the predetermined row formation of the said layer until required to be released, said suction cups being supported in a horizontally disposed frame composed of two sub-frames connected together centrally by a hinge, each sub-frame being pivotally mounted for rocking about an axis parallel to the axis of said central hinge, whereby vertical movement of said hinge rocks said sub-frames about their pivotal axes disposing said sub-frames at an obtuse angle to one another thereby causing the layer of fruit vacuum attached to the suction cups to assume an upwardly arched form and the lateral rows of fruit at least to move inwardly so that the overall width of the layer is less than the interior width of a standard fruit case.

2. Apparatus for mechanically packing fruit according to claim 1, and in which the arrangement of said two rockable sub-frames is incorporated in a self-contained pick-up head having power actuated means for vertically moving said hinge.

3. Apparatus for mechanically packing fruit according to claim 2, and in which said suction cups are supported in said frame by horizontally disposed air-tight pipe-lines rotatably mounted in said frame and connected to said source of partial vacuum by flexible tubing, said pipe-lines having depending branch pipes to the free ends of which the suction cups are attached.

4. Apparatus for mechanically packing fruit according to claim 3, and in which a pair of pick-up heads are mounted one at each end of a horizontal member to form an assembly, said assembly being angularly movable about a vertical axis midway of the said member, whereby each of said pick-up heads is alternately located at a first position and a second position and vice versa, said first position constituting a pick-up position to which a preformed layer of fruit is periodically presented by conveyor means in row formation corresponding to the disposition of said suction cups of said pick-up head and in register therewith, said second position constituting a release position at which said pick-up head is in register with an open side of the fruit case into which the layer of fruit is to be deposited.

5. Apparatus for mechanically packing fruit according to claim 4, and in which means is provided at the first position to intermittently produce relative convening movement of said conveyor means and the pick-up head so that the layer of fruit is brought into pressure contact with the suction cups by which the layer is retained.

6. Apparatus for mechanically packing fruit according to claim 5, and in which means is provided at the second position to intermittently produce relative convening movement of said pick-up head and the fruit case so that the layer of fruit retained by said suction cups is inserted into the fruit case and deposited therein upon release of the partial vacuum in the suction cups.

7. Apparatus for mechanically packing fruit according to claim 4, and in which one of said pick-up heads has its suction cups arranged to correspond with a specific layer formation presented by the conveyor means at the first position, and the other of the pick-up heads has its suction cups arranged to correspond with a complementary layer formation presented alternately by said conveyor means at the first position, whereby the fruit is deposited in the fruit case at the second position in alternating complementary layer formations.

References Cited in the file of this patent

UNITED STATES PATENTS

| | | |
|---|---|---|
| 2,738,219 | Fenimore | Mar. 13, 1956 |
| 2,938,315 | Voullaire | May 31, 1960 |
| 2,957,290 | Andreesen | Oct. 25, 1960 |